United States Patent [19]

Saunby

[11] 3,904,675

[45] Sept. 9, 1975

[54] NON-CATALYTIC LIQUID PHASE OXIDATION OF BUTANE

[75] Inventor: John B. Saunby, South Charleston, W. Va.

[73] Assignee: Union Carbide Corporation, New York, N.Y.

[22] Filed: Mar. 8, 1972

[21] Appl. No.: 232,971

[52] U.S. Cl. ...... 260/488 F; 260/530 R; 260/533 R; 260/597 R
[51] Int. Cl.² .................. C07C 45/02; C07C 51/20; C07C 67/00
[58] Field of Search ............ 260/530 R, 494, 533 R, 260/488 F, 597 R

[56] References Cited
FOREIGN PATENTS OR APPLICATIONS
988,006   3/1965   United Kingdom ................ 260/530
1,076,455   7/1967   United Kingdom ................ 260/530

*Primary Examiner*—Vivian Garner
*Attorney, Agent, or Firm*—C. J. Metz

[57] ABSTRACT

A non-catalytic liquid phase oxidation process in which n-butane is contacted with an aldehyde and oxygen in a normally liquid organic diluent, using critical ratios of aldehyde to butane, under carefully controlled conditions, to produce oxygenated products comprising acetic acid, methyl ethyl ketone, and ethyl acetate. The process results in increased methyl ethyl ketone/acetic acid ratios as well as greater productivity, total butane efficiency, and/or total oxygen efficiency.

6 Claims, No Drawings

NON-CATALYTIC LIQUID PHASE OXIDATION OF BUTANE

The instant invention is directed to a novel non-catalytic liquid phase in which n-butane is oxidized, in contact with a gas containing molecular oxygen and small amounts of an aldehyde and under carefully controlled conditions, to yield oxygenated products comprising acetic acid, methyl ethyl ketone, and ethyl acetate. By the practice of the invention there is provided a novel process in which the productivity, total butane efficiency, and/or total oxygen efficiency are markedly increased.

The term "productivity," as used herein, is defined as the total number of pounds of acetic acid, methyl ethyl ketone, and ethyl acetate produced per hour per cubic foot of reactor volume. Obviously, an increase in productivity indicates that greater amounts of desired products are being produced from a fixed reactor volume per unit of time. The "total oxygen efficiency," as used herein, represents a number expressed in percent which is determined by the total number of moles of acetic acid, methyl ethyl ketone, and ethyl acetate produced from oxygen during the oxidation process divided by the number of moles of oxygen consumed during the oxidation process, multiplied by 100. It is readily appreciated that a greater utilization of oxygen which results in a marked increase of total oxygen efficiency has a significant and beneficial impact on the economics of the oxidation process. The "total butane efficiency," as used herein, represents a number expressed in percent which is determined by the total number of moles of acetic acid, methyl ethyl ketone, and ethyl acetate produced from butane during the oxidation process divided by the number of moles of butane consumed during the oxidation process, multiplied by 100. By the practice of a suitable embodiment of the invention there can be prepared oxygenated products having a high methyl ethyl ketone plus ethyl acetate/acetic acid product ratio. Such product ratio is obtained without sacrifice in the total oxygen efficiency and the total butane efficiency. Since both methyl ethyl ketone and ethyl acetate command a higher price in the chemical market than does acetic acid an increase in the ketone plus ester/acid ratio is highly desirable from an economics standpoint.

The aldehyde which is employed in the practice of the invention can be a saturated aliphatic or cycloaliphatic or aromatic aldehyde such as acetaldehyde, propionaldehyde, n-butyraldehyde, adipaldehyde, n-valeraldehyde, caproaldehyde, heptaldehyde, benzaldehyde, o-tolualdehyde, m-tolualdehyde, p-tolualdehyde, cyclohexanecarboxyaldehyde, 1-naphthaldehyde, and the like. Saturated aliphatic aldehydes having up to four carbon atoms are preferred. Acetaldehyde is most preferred.

In the practice of the invention the amount of aldehyde employed relative to butane and the operative temperature range are quite critical. It has been discovered quite unexpectedly, indeed, the small amounts of aldehyde augment the novel oxidation process to the point that one is able to feed greater quantities of oxygen to the oxidation zone, within a significantly defined temperature range, without encountering explosive mixtures in the spent gas. These factors result in much higher productivities than heretofore obtainable by commercial processes. The molar ratio of aldehyde to butane processes. The molar ratio of aldehye to butane which are thus necessary fall within the range of 1:25 to about 1:150, preferably from about 1:30 to about 1:75, while effecting the oxidation reaction at a temperature in the range of from about 155°C. to about 200°C., preferably from about 165°C. to about 185°C. Moreover, it should be emphasized that the beneficial and advantageous results described throughout this specification are achieved by operating the novel process in the absence of catalysts and/or initiators such as cobalt salts, ozone, alkyl hydroperoxides, dialkyl peroxides, and the like.

The novel process is carried out under sufficient total pressure to maintain a liquid reaction medium. Since the critical temperature of n-butane is about 154°C. the process is desirably conducted under moderately superatmospheric pressure (which is mainly butane and the gas containing molecular oxygen) to thus maintain a liquid solution of butane in a normally liquid organic diluent. That is to say, a diluent is employed which dissolves or is miscible with the reactants. Suitable diluents include ketones, esters, carboxylic acids, etc., such as acetone, methyl ethyl ketone, acetic acid, propionic acid, ethyl acetate, methyl acetate, mixtures thereof, and the like. Highly satisfactory results are obtained by using, as the diluent, a recycle stream comprising liquid oxidation products produced by the process. Such liquid oxidation products comprise acetic acid, methyl ethyl ketone, ethyl acetate, and smaller amounts of other materials. Superatmospheric pressures ranging upwards to about 5,000 psig, and higher, can be employed, but the most beneficial results have been observed by using a total pressure below about 2,500 psig, preferably from about 700 psig to about 1,200 psig.

The gas containing molecular oxygen may be oxygen, air, mixtures comprising oxygen and butane, oxygen diluted with other gases which are inert under the reaction conditions, e.g., carbon dioxide, nitrogen, etc. It is desirable to operate the novel process using fairly high purity oxygen. For obvious safety reasons the novel process is operated outside the explosive limits. Thus the oxygen introduced into the system is regulated so that the oxygen content in the exit gas stream, i.e., the spentgas or off-gas, is kept below 10 volume percent, preferably below about 3 volume percent. In general, the butane/oxygen molar ratio is in the range of from about 1:1 to about 20:1, and desirably from about 3:1 to about 10:1.

The novel process is conducted for a period of time sufficient to produce oxygenated products comprising acetic acid, methyl ethyl ketone, and ethyl acetate. The residence period can range from a few minutes to a few hours, e.g., from about 5 minutes to about 1 hour. In the practice of a suitable embodiment of the invention, high productivities are achieved by maintaining the residence period up to approximately 30 minutes. The novel process can be executed in a batch, semi-continuous, or continuous fashion. The reaction can be conducted in a single reaction zone or a plurality of reaction zones, in series or in parallel, or it may be conducted intermittently or continuously in an elongated tubular zone or series of such zones. The material of construction should be such that it is inert during the reaction and such material can include, for example, titanium, glass, porcelain, stainless steel, enamel, and the like. The reaction zone can be fitted with internal and/or external heat exchanger(s) to thus control undue temperature fluctuations, or to prevent any possible "run-away" reaction temperatures due to the exothermic nature of the reaction. In various embodiments of the invention, agitation means to vary the degree of mixing the reaction mixture can be suitably employed. Mixing induced by vibration, shaker, stirrer, rotatory, oscillation, ultrasonic, loop reactors, etc., are illustrative of the types of agitation means which can be employed, if desired. Such means are available and well-known to the art. Means to introduce and/or adjust the reactants, either intermittently or continuously, into the reaction zone during the course of the reaction can be conveniently utilized in the novel process especially to maintain the desired molar ratios of and the partial pressures exerted by the reactants.

In the practice of the invention the operative conditions can be adjusted to further optimize the economics of the novel process. In a continuous process, for instance, it is preferred to recirculate unreacted butane as a recycle stream comprising liquid oxidation products. Fresh butane, aldehyde, and oxygen are also introduced into the recycle stream or the oxidation zone in quantities sufficient to maintain optimum productivity and efficiencies. Recovery and resolution of the reaction products, e.g., acetic acid, methyl ethyl ketone, and ethyl acetate, can be achieved by methods well-known in the art such as by distillation, fractionation, extraction, and the like.

In the following illustrative Examples, various terms and abbreviations are employed. They are explained below.

SCFH represents standard cubic feet per hour.

GPH/GVR represents gallons of liquid mixture per hour per gallon reactor volume. The liquid mixture introduced into the oxidation reaction comprised n-butane and liquid oxidation products (mainly acetic acid, MEK, and ethyl acetate).

HOAc represents acetic acid.

MEK represents methyl ethyl ketone.

reactor. A system of pumps was employed to feed acetic acid, n-butane, oxygen, acetaldehyde, and recycle material comprising n-butane and liquid oxidation products such as acetic acid, MEK, ethyl acetate and smaller amounts of other materials, to the reactor. The reaction pressure was maintained at about 800 psig. After the oxidation reaction commenced, the reaction product mixture was withdrawn at such a rate as to maintain a constant volume in the reactor. The residence period was approximately 10–15 minutes. The effluent comprised acetic acid, ethyl acetate, methyl ethyl ketone, n-butane, and water. By-product gases such as carbon dioxide, nitrogen, carbon monoxide, methane, and ethane were continuously vented from the system. Analysis of the by-product gases confirmed that oxygen was almost completely consumed during the oxidation reaction. The liquid effluent was allowed to separate in a decanter into two phases. The upper phase was subsequently recycled to the reactor. The principal components in this phase (recycle material) were unreacted n-butane and acetic acid and lesser amounts of MEK and ethyl acetate. The lower phase comprising acetic acid, methyl ethyl ketone, and ethyl acetate was resolved into its major components by fractional distillation.

The results and data including mole ratios of n-butane/acetaldehyde, oxygen and n-butane feed rates, temperature, productivity, efficiencies from n-butane and oxygen, and gallons of liquid mixture per hour to the reactor/per gallon reactor volume, are given in Table I infra. The acetaldehyde concentration is based on fresh n-butane plus unreacted n-butane in the recycle material. For purposes of calculating the quantity of acetic acid produced, it was assumed that all of the acetaldehyde added to the reactor was converted to acetic acid. This quantity of acetic acid was then subtracted from the total acetic acid produced during the oxidation process.

TABLE I

| EXAM. No. | TEMP. °C. | RATE, GPH/GVR[1] | $O_2$ FEED SCFH[2] | $C_4H_{10}/CH_3CHO$ MOLE RATIO | $C_4H_{10}$ FEED, LBS/HOUR[3] |
|---|---|---|---|---|---|
| 1 | 185° | 6 | 46.5 | — | 4.5 |
| 2 | 185° | 6 | 59.0 | 36:1 | 5.7 |
| 3 | 175° | 6 | 46.5 | 36:1 | 4.1 |
| 4 | 165° | NO COMMERCIALLY SIGNIFICANT REACTION WITHOUT ALDEHYDE ADDED TO THE REACTOR | | | |
| 5 | 165° | 6 | 34.0 | 36:1 | 2.9 |
| 6 | 165° | 6 | 29.0 | 75:1 | 2.4 |

| | PRODUCTIVITY LBS/HOUR/FT | | | | EFFICIENCY FROM $C_4H_{10}$, % | | | | EFFICIENCY FROM $O_2$, % | | | |
|---|---|---|---|---|---|---|---|---|---|---|---|---|
| EXAM. No. | HOAc[4] | MEK[5] | EtAc[6] | TOTAL | HOAc | MEK | EtAc | TOTAL | HOAc | MEK | EtAc | TOTAL |
| 1 | 15.4 | 2.2 | 1.1 | 18.7 | 45.7 | 11.0 | 4.6 | 61.3 | 34.0 | 2.0 | 1.7 | 37.7 |
| 2 | 24.8 | 2.7 | 1.6 | 29.1 | 45.1 | 11.1 | 5.4 | 61.6 | 37.6 | 2.0 | 1.9 | 41.5 |
| 3 | 20.4 | 3.1 | 1.9 | 25.4 | 42.9 | 15.2 | 7.5 | 65.6 | 41.2 | 3.1 | 3.0 | 47.3 |
| 4 | NO COMMERCIALLY SIGNIFICANT REACTION WITHOUT ALDEHYDE ADDED TO THE REACTOR | | | | | | | | | | | |
| 5 | 15.7 | 3.2 | 1.7 | 20.6 | 36.3 | 19.2 | 8.5 | 64.0 | 40.1 | 4.1 | 3.6 | 47.8 |
| 6 | 10.9 | 2.9 | 1.4 | 15.2 | 32.6 | 19.6 | 7.8 | 60.0 | 35.5 | 4.5 | 3.6 | 43.6 |

[1] Rate, GPH/GVR represents gallons of liquid mixture (n-butane dissolved in primarily acetic acid and acetaldehyde, if any) introduced into the oxidation reactor per hour/per gallon of reactor volume.
[2] $O_2$ FEED SCFH represents the number of standard cubic feet of oxygen introduced into the reactor per hour.
[3] $C_4H_{10}$ FEED, LBS/HR represents the quantity of fresh butane introduced into the reactor, the quantity being expressed in pounds per hour.
[4] HOAc represents acetic acid.
[5] MEK represents methyl ethyl ketone.
[6] EtAc represents ethyl acetate.

EtAc represents ethyl acetate.

EXAMPLES 1–6

In the following Examples, the oxidation reaction was conducted in continuous fashion using a stainless steel

What is claimed is:

1. A process for the production of oxygenated products comprising acetic acid, methyl ethyl ketone, and ethyl acetate which comprises reacting n-butane and an aldehyde selected from the group consisting of saturated aliphatic aldehydes, saturated cycloaliphatic aldehydes, and aromatic aldehydes, and wherein the sole functional group in said aldehyde is formyl, in contact with a gas containing molecular oxygen, in the presence of a normally-liquid organic diluent that is a solvent for or is miscible with said aldehyde and butane, under sufficient pressure to maintain a liquid phase reaction, in the absence of a catalyst, at a temperature in the range of from about 155°C. to about 200°C., using molar ratios of aldehyde to n-butane in the range of from 1:25 to about 1:50 and molar ratios of n-butane to oxygen in the range of from about 1:1 to abaout 20:1, and conducting said reaction for a period of time sufficient to produce said oxygenated products.

2. The process of claim 1 wherein said pressure is below about 2,500 psig.

3. The process of claim 2 wherein said temperature is in the range of from about 165°C to about 185°C.

4. The process of claim 2 wherein said diluent is a recycle stream comprising liquid oxygenated products of said process.

5. The process of claim 4 wherein said aldehyde is a saturated aliphatic aldehyde having up to four carbon atoms.

6. The process of claim 5 wherein said aldehyde is acetaldehyde.

* * * * *